(12) United States Patent
Ganswich

(10) Patent No.: US 7,401,770 B1
(45) Date of Patent: Jul. 22, 2008

(54) STABILIZER FOR A VEHICLE WITH SUSPENSION SPRINGS

(76) Inventor: William G. Ganswich, 6130 Woodland Dr., Ogden, UT (US) 84403

( * ) Notice: Subject to any disclaimer, the term of this patent is extended or adjusted under 35 U.S.C. 154(b) by 0 days.

(21) Appl. No.: 11/807,247

(22) Filed: May 24, 2007

(51) Int. Cl.
B60G 15/06 (2006.01)
B60G 11/14 (2006.01)

(52) U.S. Cl. .................. 267/179; 267/174; 280/151

(58) Field of Classification Search ............. 267/170, 267/174, 179, 220; 248/575, 580, 634; 280/124.13, 280/124.131, 124.151, 124.152
See application file for complete search history.

(56) References Cited

U.S. PATENT DOCUMENTS

| 4,466,636 | A | * | 8/1984 | Cornacchia et al. ... 280/124.116 |
| 5,636,826 | A | * | 6/1997 | Nakagaki et al. ............ 248/562 |
| 5,823,558 | A | * | 10/1998 | Shoquist .................. 280/405.1 |
| 5,887,881 | A | * | 3/1999 | Hatch ................... 280/124.175 |
| 6,062,579 | A | * | 5/2000 | Fortier ...................... 280/124.1 |
| 6,260,836 | B1 | * | 7/2001 | Aoyama et al. ............. 267/221 |
| 6,513,798 | B2 | * | 2/2003 | Capek et al. ............. 267/64.27 |
| 7,195,217 | B1 | * | 3/2007 | Wadensten ............. 248/223.41 |

* cited by examiner

Primary Examiner—Christopher P Schwartz
(74) Attorney, Agent, or Firm—Fehr Law Firm; Thompson E. Fehr

(57) ABSTRACT

A stabilizer for a vehicle with suspension springs having a rigid member with a face and back. An upper stop is on the face of the stabilizer near an upper aperture passing through the stabilizer from the face to the back, and a lower stop is on the face of the stabilizer near a lower aperture passing through the stabilizer from the face to the back. An upper L-shaped bolt is fastened in the upper aperture with the shorter leg of the bolt oriented toward the upper stop in order, together with the rigid member, to create a channel within which a first portion of a suspension spring is retained. A lower L-shaped bolt is similarly fastened in the lower aperture with the lower leg of the bolt oriented toward the lower stop to create a channel within which a first portion of the suspension spring is retained.

9 Claims, 5 Drawing Sheets

STABILIZER FOR A VEHICLE WITH SUSPENSION SPRINGS

BACKGROUND OF THE INVENTION

1. Field of the Invention

This invention relates to a device for reducing or eliminating the effect of all or a portion of a suspension spring, especially such a spring in an all-terrain vehicle (ATV).

2. Description of the Related Art

Applicant is unaware of any similar device.

BRIEF SUMMARY OF THE INVENTION

The Stabilizer for a Vehicle with Suspension Springs comprises a rigid member having an upper stop, a lower stop, an upper aperture near the upper stop, a lower aperture near the lower stop, an upper L-shaped bolt that is removably inserted into the upper aperture, and a lower L-shaped bolt that is removably inserted into the upper aperture. An upper fastener, preferably a nut, retains the upper L-shaped bolt in place; and a lower fastener, preferably a nut, retains the lower L-shaped bolt in place.

Each bolt and the stop near it, together with the rigid member, form a channel through which a suspension spring passes. The Stabilizer, consequently, precludes the suspension spring from being extended or compressed between the two channels.

This can be very helpful in making the suspension stiffer.

DETAILED DESCRIPTION OF THE INVENTION

Figure 1:
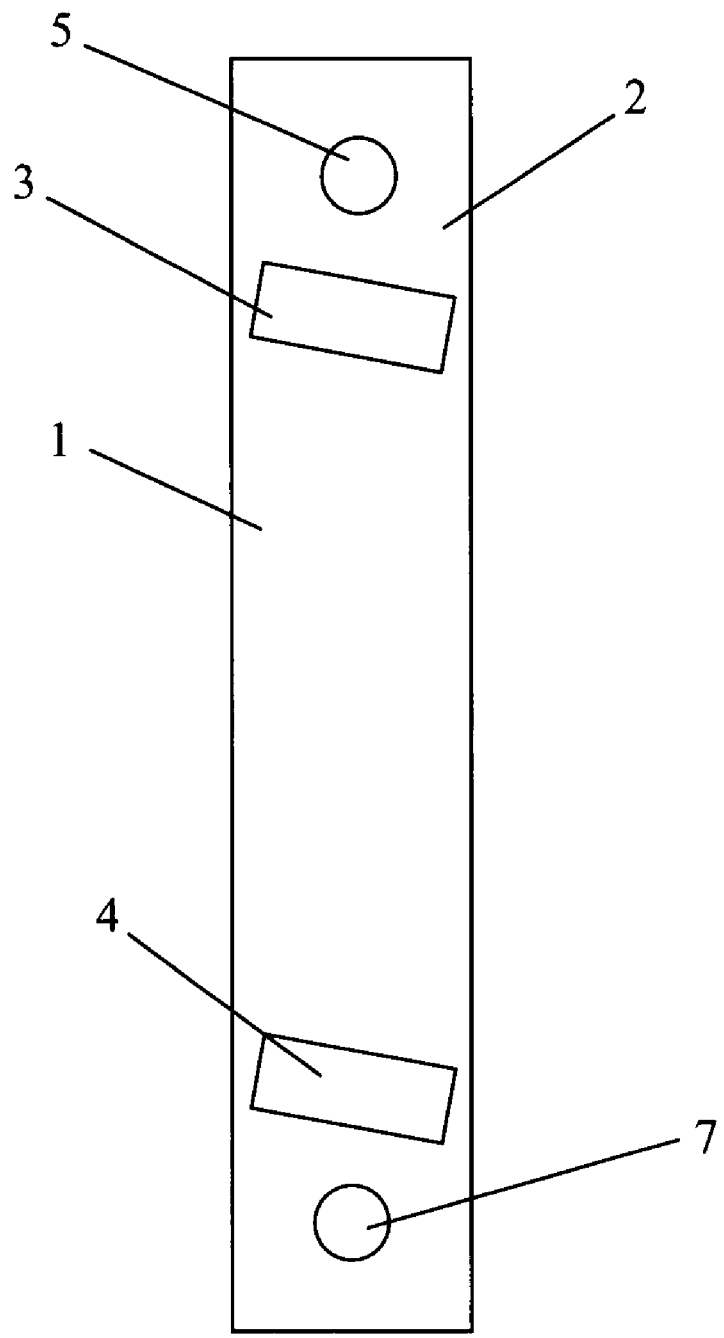
FIG. 1 portrays the face of a preferred embodiment of the Stabilizer for a Vehicle with Suspension Springs.
Figure 2:
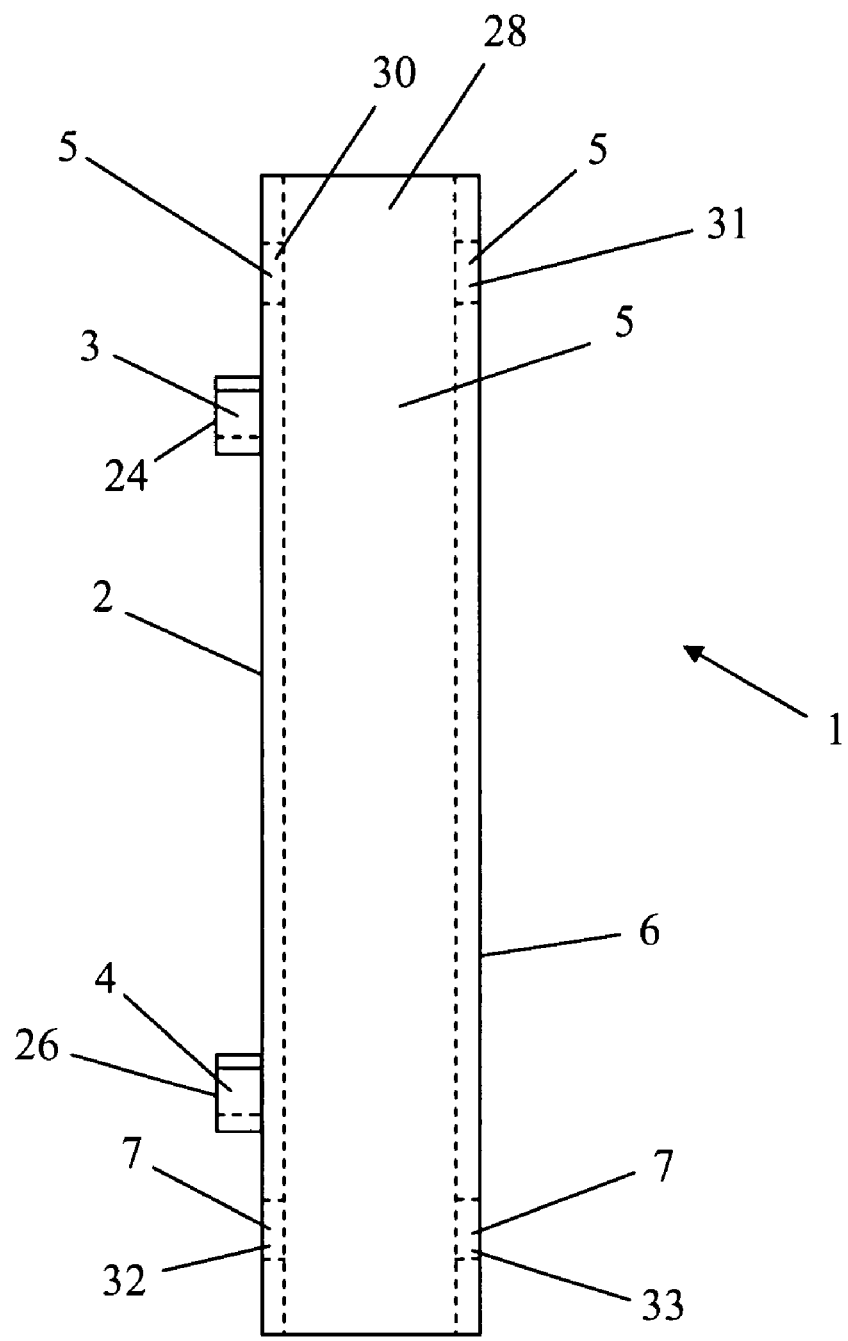
FIG. 2 shows a side of the embodiment of FIG. 1.

The principal feature of the Stabilizer for a Vehicle with Suspension Springs is, as illustrated in FIGS. 1 and 2, a rigid member 1.

On the face 2 of the rigid member 1 are located an upper stop 3 and a lower stop 4. Near (and either above or below) the upper stop 3 is, as shown in FIG. 1 and FIG. 2, an upper aperture 5 which proceeds from the face 2 of the rigid member 1 through the rigid member 1 to the back 6 of the rigid member 1. Similarly, near (and either above or below) the lower stop 4 is, as shown in FIG. 1 and FIG. 2, a lower aperture 7 which proceeds from the face 2 of the rigid member 1 through the rigid member 1 to the back 6 of the rigid member 1. (Although the terms "upper" and "lower" are used since a suspension spring 8 is generally installed in a substantially vertical orientation, the suspension spring 8 and Stabilizer can be installed in any orientation.)

Figure 3:
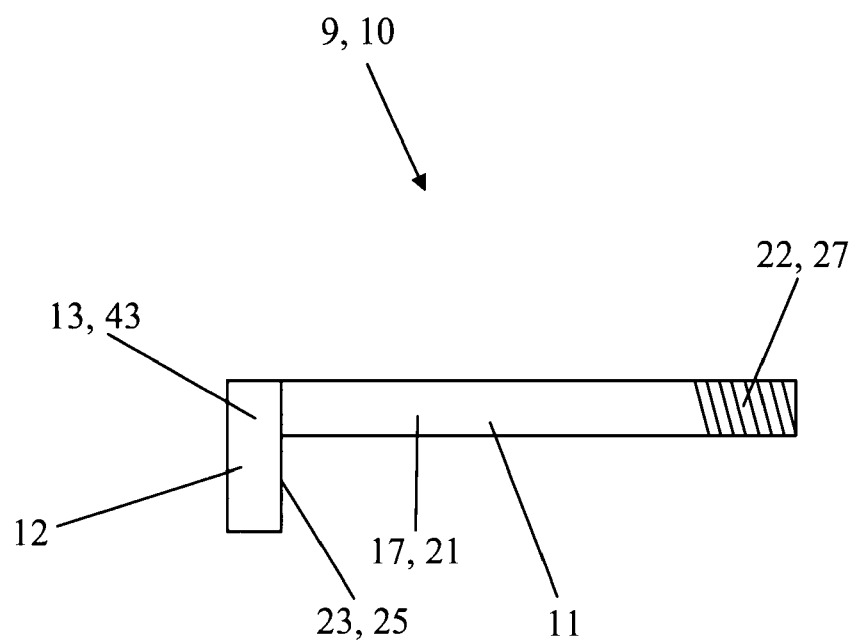
FIG. 3 illustrates one of the L-shaped bolts.

Each L-shaped bolt 9, 10 has a traditional longitudinal body 11 with a substantially perpendicular head 12, as seen in FIG. 3. The body 11 and head 12 can be created in any way which is well known in the art, such as machining from a single block, but are preferably attached to one another with any adhesive that is well known in the art.

Figure 4:
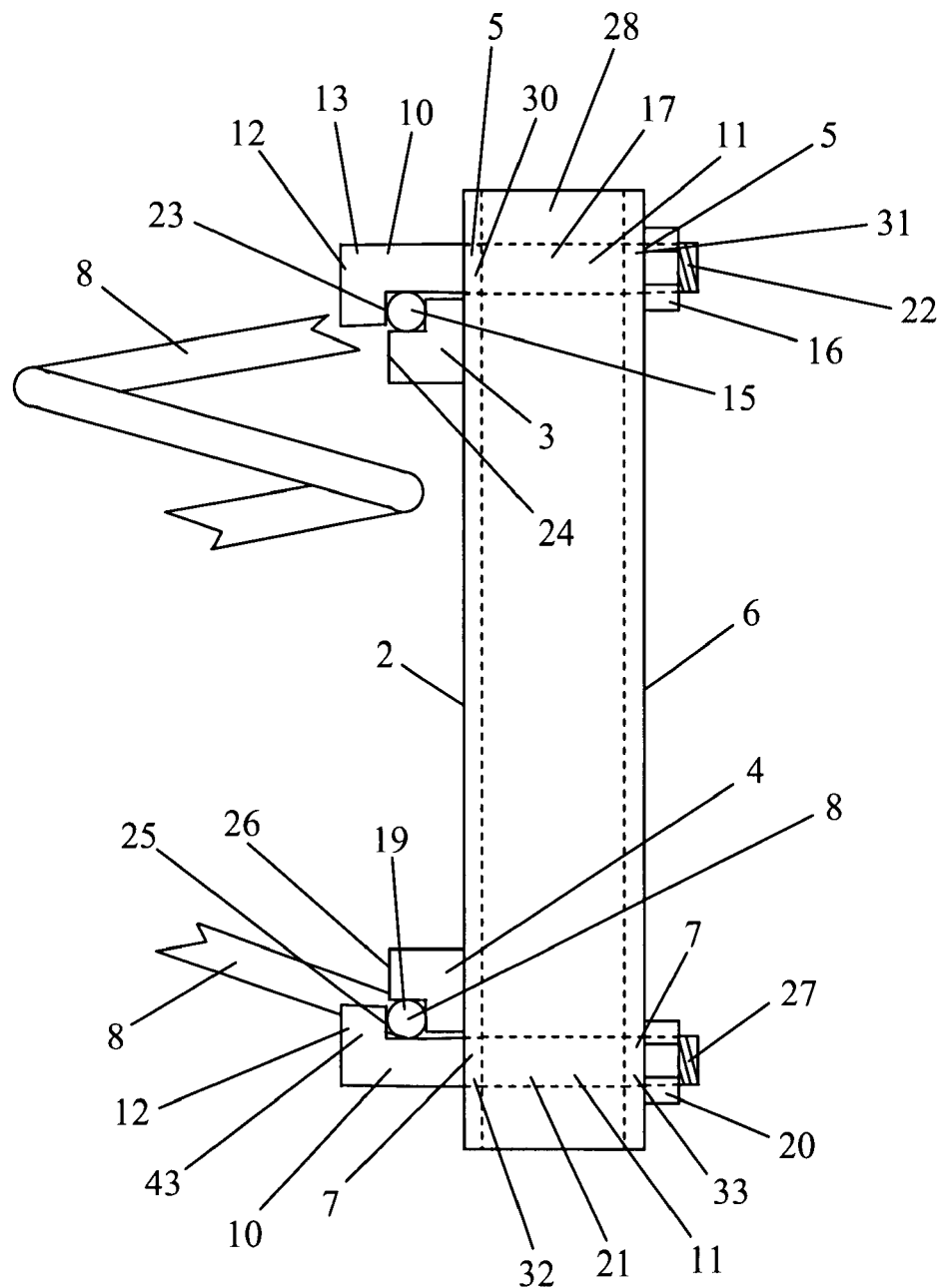
FIG. 4 depicts a preferred embodiment of the Stabilizer wherein the rigid member has a hollow center, installed on a suspension spring.

When installed on a suspension spring 8, as shown in FIG. 4, the upper bolt 9 is in the upper aperture 5 with the shorter leg 13, i.e., the head 12, of the upper bolt 9 oriented toward the upper stop 3 in order to create, together with the rigid member 1, the upper channel 14 within which a first portion 15 of the suspension spring 8 is retained. The upper bolt 9 is securely held in the rigid member 1 by an upper fastener 16, which is preferably removable and which is, even more preferably, a threaded nut. The upper fastener 16 is preferably attached to the longer leg 17, i.e., the body 11 of the upper bolt 9. Similarly, when installed on a suspension spring 8, as shown in FIG. 4, the lower bolt 10 is in the lower aperture 7 with the shorter leg 43, i.e., the head 12, of the lower bolt 10 oriented toward the lower stop 4 in order to create, together with the rigid member 1, the lower channel 18 within which a second portion 19 of the suspension spring 8 is retained. The lower bolt 10 is securely held in the rigid member 1 by a lower fastener 20, which is preferably removable and which is, even more preferably, a threaded nut. The lower fastener 20 is preferably attached to the longer leg 21, i.e., the body 10 of the lower bolt 9. When a threaded nut is employed as the fastener 16, 20 with either of the bolts 9, 10, such nut attaches to the free end 22, 27 of each of the bolts 9, 10; and the free end 22, 27 of each of such bolts 9, 10 is threaded.

The length of the body 11 of the upper bolt 9 is such that when the rear 23 of the head 12 is near the outward face 24 of the upper stop 3, the free end 22 of the body 11 of the upper bolt 9 extends through the upper aperture 5 beyond the back 6 of the rigid member 1 sufficiently far that the upper fastener 16 can be attached to the body 11 of the upper bolt 9. Similarly, the length of the body 11 of the lower bolt 10 is such that when the rear 25 of the head 12 is near the outward face 26 of the lower stop 4, the free end 27 of the body 11 of the lower bolt 10 extends through the lower aperture 7 beyond the back 6 of the rigid member 1 sufficiently far that the lower fastener 20 can be attached to the body 11 of the lower bolt 10.

Figure 5:
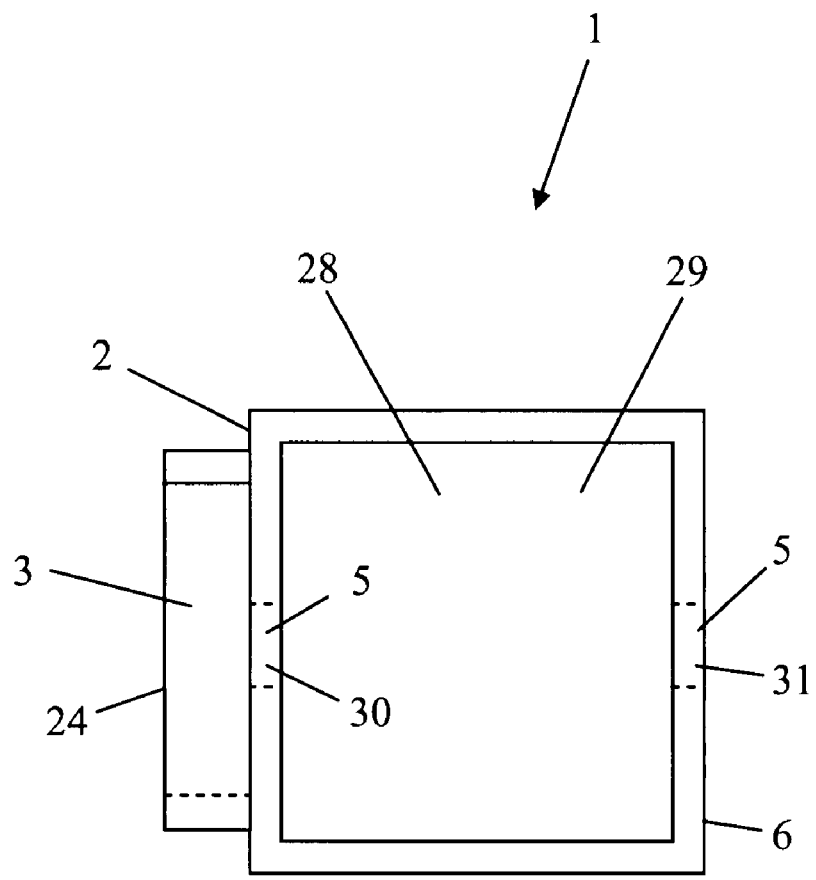
FIG. 5 is a plan view of a preferred embodiment of the rigid member, which has a hollow center and a square cross-sectional area.

Preferably, the rigid member 1 has, as illustrated in FIG. 2, a hollow center 28 and a square cross-sectional area 29 as portrayed in FIG. 5. When the rigid member 1 has a hollow center 28, the terminology "upper aperture 5 which proceeds from the face 2 of the rigid member 1 through the rigid member 1 to the back 6 of the rigid member 1" as used herein shall mean the combination of a first upper aperture 30 in the face 2 of the rigid member 1 and a second upper aperture 31 which is in the back 6 of the rigid member 1 and is concentrically aligned with the first upper aperture 30; and the terminology "lower aperture 7 which proceeds from the face 2 of the rigid member 1 through the rigid member 1 to the back 6 of the rigid member 1" as used herein shall mean the combination of a first lower aperture 32 in the face 2 of the rigid member 1 and a second lower aperture 33 which is in the back 6 of the rigid member 1 and is concentrically aligned with the first lower aperture 33, as illustrated in FIG. 4.

Since vehicles, including ATV's, generally have suspension springs 8 arranged in pairs of a left spring and a right spring, it is, in practice, preferable to utilize one suspension spring 8 on the left spring and a second suspension spring 8 on the right spring.

As used herein, the term "substantially" indicates that one skilled in the art would consider the value modified by such terms to be within acceptable limits for the stated value. Also as used herein the term "preferable" or "preferably" means that a specified element or technique is more acceptable than another but not that such specified element or technique is a necessity.

I claim:

1. A stabilizer for a vehicle with suspension springs, which comprises:
   a rigid member having a face and a back with an upper aperture and a lower aperture proceeding from the face of said rigid member to the back of said rigid member;
   an upper stop on the face of said rigid member near the upper aperture, said upper stop having an outward face;
   an upper L-shaped bolt having a head with a rear, such head being oriented toward said upper stop, and said upper L-shaped bolt also having a body with a free end, such body being inserted into the upper aperture so that the rear of the head of said upper L-shaped bolt is near the outward face of said upper stop;
   an upper fastener attached to the body of said upper L-shaped bolt, the extension of the free end of the body of said upper L-shaped bolt beyond the back of said rigid member being sufficient to permit the attachment of such upper fastener to the body of said upper L-shaped bolt;
   an upper stop on the face of said rigid member near the lower aperture, said lower stop having an outward face;
   a lower L-shaped bolt having a head with a rear, such head being oriented toward said lower stop, and said upper L-shaped bolt also having a body with a free end, such body being inserted into the upper aperture so that the rear of the head of said upper L-shaped bolt is near the outward face of said upper stop; and
   a lower fastener attached to the body of said lower L-shaped bolt, the extension of the free end of the body of said lower L-shaped bolt beyond the back of said rigid member being sufficient to permit the attachment of such lower fastener to the body of said lower L-shaped bolt.

2. The stabilizer for a vehicle with suspension springs as recited in claim 1, wherein:
   said upper fastener is removably attached to the body of said upper L-shaped bolt; and
   said lower fastener is removably attached to the body of said lower L-shaped bolt.

3. The stabilizer for a vehicle with suspension springs as recited in claim 2, wherein:
   said upper fastener is a threaded nut and is attached to the free end of the body of said upper L-shaped bolt;
   the free end of the body of said upper L-shaped bolt is threaded;
   said lower fastener is a threaded nut and is attached to the free end of the body of said lower L-shaped bolt; and
   the free end of the body of said lower L-shaped bolt is threaded.

4. The stabilizer for a vehicle with suspension springs as recited in claim 3, wherein:
   said rigid member has a hollow center; and
   said rigid member has a square cross-sectional area.

5. The stabilizer for a vehicle with suspension springs as recited in claim 2, wherein:
   said rigid member has a hollow center; and
   said rigid member has a square cross-sectional area.

6. The stabilizer for a vehicle with suspension springs as recited in claim 1, wherein:
   said upper fastener is a threaded nut and is removably attached to the free end of the body of said upper L-shaped bolt;
   the free end of the body of said upper L-shaped bolt is threaded for attachment of the nut;
   said lower fastener is a threaded nut and is removably attached to the free end of the body of said lower L-shaped bolt; and
   the free end of the body of said lower L-shaped bolt is threaded.

7. The stabilizer for a vehicle with suspension springs as recited in claim 6, wherein:
   said rigid member has a hollow center; and
   said rigid member has a square cross-sectional area.

8. The stabilizer for a vehicle with suspension springs as recited in claim 1, wherein:
   said rigid member has a hollow center; and
   said rigid member has a square cross-sectional area.

9. A stabilizer for a vehicle with suspension springs, which comprises:
   a rigid member having a face and a back with an upper aperture and a lower aperture proceeding from the face of said rigid member to the back of said rigid member, said rigid member also having a hollow center and a square cross-sectional area;
   an upper stop on the face of said rigid member near the upper aperture, said upper stop having an outward face;
   an upper L-shaped bolt having a head with a rear, such head being oriented toward said upper stop, and said upper L-shaped bolt also having a body with a threaded free end, such body being inserted into the upper aperture so that the rear of the head of said upper L-shaped bolt is near the outward face of said upper stop;
   an upper fastener, said upper fastener being a threaded nut threadedly attached to the free end of the body of said upper L-shaped bolt, the extension of the free end of the body of said upper L-shaped bolt beyond the back of said rigid member being sufficient to permit the attachment of such upper fastener to the body of said upper L-shaped bolt;
   an lower stop on the face of said rigid member near the lower aperture, said lower stop having an outward face;
   a lower L-shaped bolt having a head with a rear, such head being oriented toward said lower stop, and said upper L-shaped bolt also having a body with a threaded free end, such body being inserted into the upper aperture so that the rear of the head of said upper L-shaped bolt is near the outward face of said upper stop; and
   a lower fastener, said lower fastener being a threaded nut threadedly attached to the body of said lower L-shaped bolt, the extension of the free end of the body of said lower L-shaped bolt beyond the back of said rigid member being sufficient to permit the attachment of such lower fastener to the body of said lower L-shaped bolt.

* * * * *